United States Patent Office 3,077,938
Patented Feb. 19, 1963

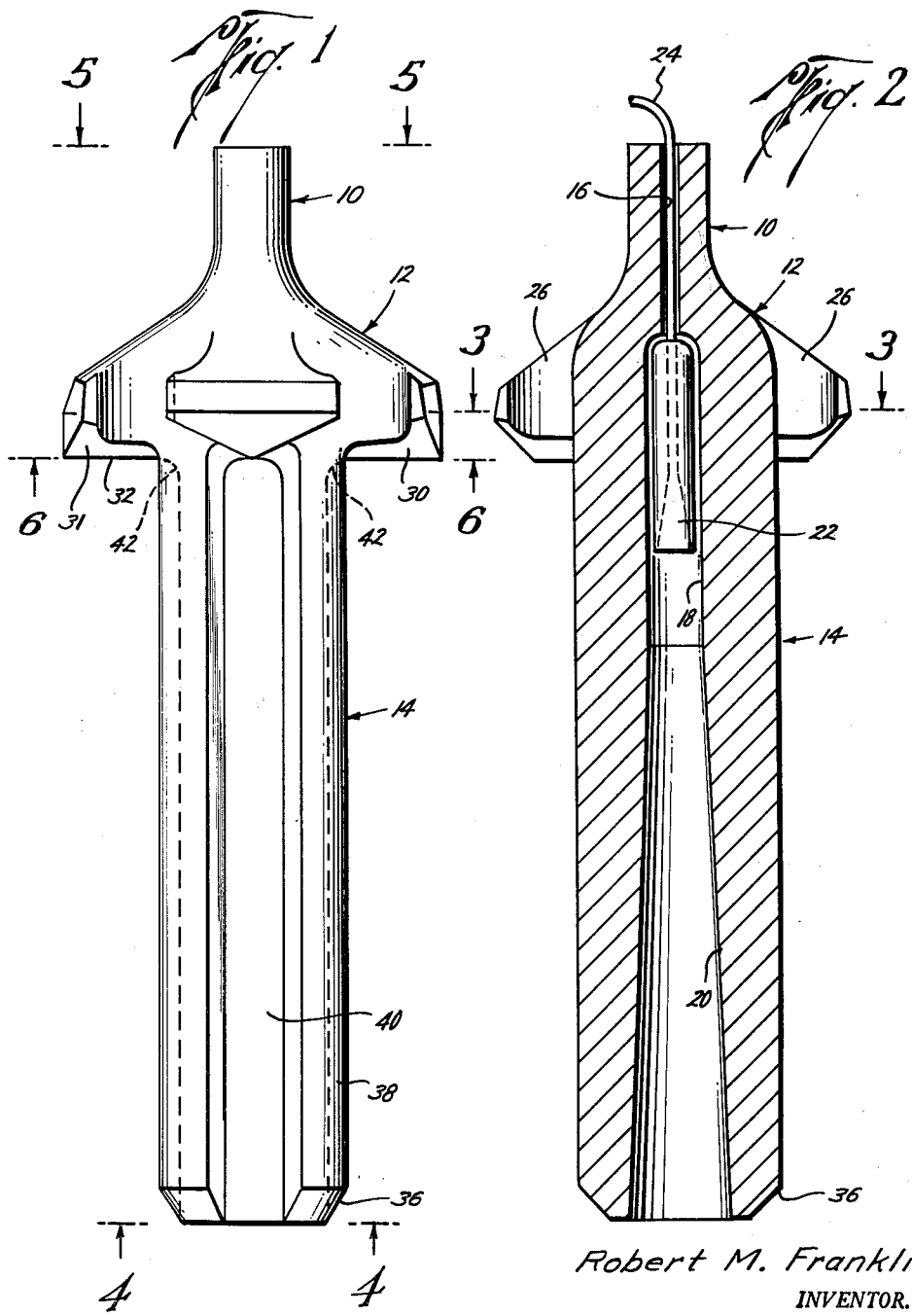

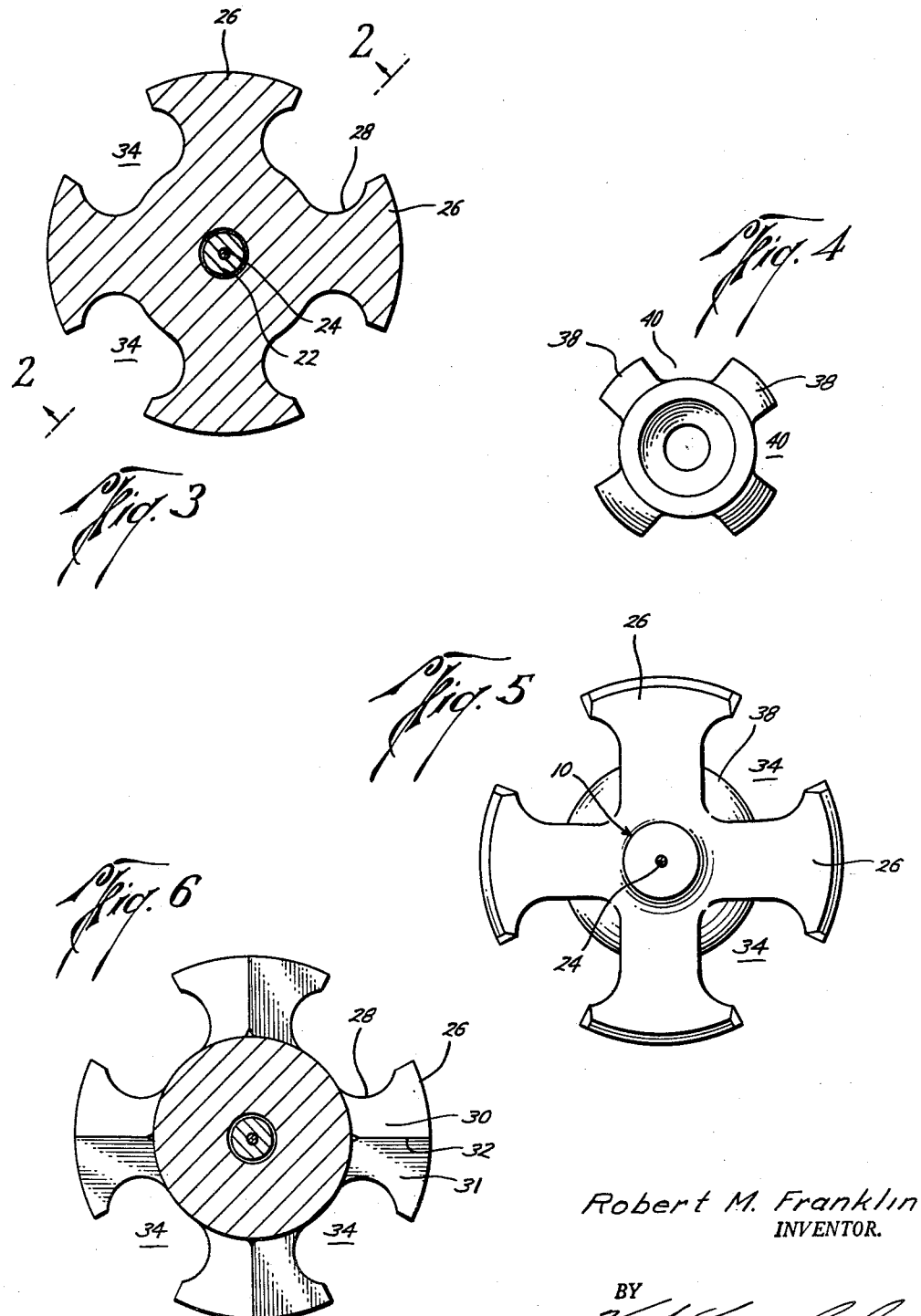

3,077,938
CABLE TOOL REAMER
Robert M. Franklin, Ozona, Tex., assignor to Layne-Franklin Company, a corporation of Texas
Filed Dec. 8, 1959, Ser. No. 858,203
8 Claims. (Cl. 175—407)

This invention relates to an improved cable tool reamer, particularly adapted to enlarge bore holes to diameters ranging from 18 inches to 42 inches and larger, such as are used as air shafts in mines and the like, and also for many water wells.

Generally, in the preparation of such holes, a pilot hole is first drilled with a conventional drill bit, either by cable tool or rotary methods. Then the first pilot hole is reamed and re-reamed until the desired diameter is reached. With larger holes, it is virtually impossible to use rotary methods for reaming, because of the tremendous torque required, especially when drilling through rock and other difficult formations. Thus cable tool methods are generally used for the reaming.

Cable tool reamers generally have a pilot at the lower end for guiding of the reamer by the pilot hole. Above the pilot a plurality of ground-engaging cutter blades are attached to the body, which has at its top means for attaching a cable or other tools necessary in drilling. The reamer is repeatedly raised and dropped, the cutter blades cutting the formation with each drop. A twist is applied to the cable to rotate the reamer slightly with each stroke.

It will be appreciated that such cable tool reamers are quite large in size, usually weighing several thousand pounds. Heretofore, such reamers have been made by fabricating; that is, the reamer was made is several pieces, and then welded together. This method of manufacture resulted in a reamer which was much weaker than was desirable, because of the weld joints. Drillers who used such reamers experienced a great deal of difficulty with them, because of the tremendous amount of breakage. Cable tool drilling requires that the bit or reamer be raised off the formation being drilled, and then dropped, the speed of drilling being proportional to the force of the blow. It is therefore desirable that the bit or reamer be highly resistant to impact. It has been found that such high impact resistance is not possible in the larger diameter reamers when they are fabricated by welding, due to weakness at weld joints, and to stresses set up in the reamer during welding. Furthermore, it is difficult to obtain a sound weld with materials which have the strength and impact resistance required for these large reamers.

According to the present invention, a reamer is provided for reaming holes to diameters greater than 18 inches which may be manufactured by casting in one piece.

Accordingly, it is an object of this invention to provide a unitary reamer capable of withstanding the forces required for reaming holes to diameters of 18 inches or greater. It is another object to provide a large diameter cable tool reamer which is substantially free of stresses which can cause breakage of the reamer during use.

The accomplishment of these and other objects will become more apparent upon consideration of the following description and the attached drawing, wherein FIGURE 1 is an elevational view of one embodiment of a cable tool reamer constructed in accordance with the invention, FIGURE 2 is a vertical sectional view of the embodiment of FIGURE 1, taken on line 2—2 of FIGURE 3, FIGURE 3 is a horizontal sectional view of the same embodiment, taken at line 3—3 of FIGURE 2, FIGURE 4 is a bottom plan view of the same embodiment, taken at lines 4—4 of FIGURE 1, FIGURE 5 is a top plan view of the same embodiment, taken at line 5—5 of FIGURE 1, and FIGURE 6 is a horizontal sectional view of the same embodiment, taken at line 6—6 of FIGURE 1.

As may be seen in FIGURES 1 and 2, the reamer of this invention comprises a body having a reduced neck portion 10, a cutter portion 12, and a pilot portion 14. Neck portion 10 has an axially disposed passageway 16 which extends therethrough into cutter portion 12, communicating there with an enlarged axially disposed passageway 18 extending downwardly through the cutter portion 12 and the pilot portion 14. Passageway 18 has a downwardly expanding tapered portion 20 which extends to the lower end of the pilot portion. Passageways 16, 18 are provided for retention and passage of a rope socket 22 and a wire line 24 fastened in the rope socket, and also for another purpose to be hereinafter described. Rope socket 22 may be of any conventional type, and need not be further described herein. Wire line 24 is used for lowering the reamer into the hole to be reamed, and for raising the reamer to perform dilling opeations.

Cutter portion 12 is provided with a plurality of cutter blades 26, four being shown in the drawing.

The cutter blades are integral with the cutter portion 12 and merge smoothly therewith, the top of each blade being blended into the juncture of neck portion 10 and cutter portion 12 with a large radius fillet, and extending downwardly and outwardly therefrom so that the outer or gage surface of the cutter blade has a lesser height, or vertical thickness, than at the juncture of the cutter blade and the body of the reamer. Each cutter blade 26 is in the form of a radially extending arm having a portion 28 of reduced width blending smoothly with the body of the reamer. The outer portion of each cutter is enlarged in width, and each cutter is arcuately formed on its outer end so that the ends of the cutters conform to a circle having the diameter of the hole to be formed by the reamer. The lower edge of each cutter is formed with a pair of cutter surfaces 30, 31 which converge toward each other at an obtuse angle in relation to each other to form a cutting edge 32. The adjacent cutter blades form substantially smoothly rounded fluid passages 34 therebetween.

Cutter surfaces 30, 31 and cutting edges 32 are preferably surfaced with some hard material, such as a metal carbide, to increase the life of the cutting edge. Actually, the reamer does little cutting as such, but merely crushes the rock, so that a cutting edge is used merely to concentrate the force obtained upon dropping the reamer to the bottom of the hole. Thus an obtuse angle between cutting surfaces 30, 31 is desirable, since the edge will then break down less easily. An angle of about 120° is usual, although angles of from about 100° to about 140° may be used with good results.

The pilot portion 14 of the reamer is substantially longer than, usually 3 to 6 times as long as, the cutter portion 12, in order to allow the reamer to be dropped a considerable distance without ever having to pull the pilot out of the pilot hole. The lower end of the pilot portion is bevel'ed at 36 to insure ready entrance of the pilot into the pilot hole when the reamer is first inserted. The pilot portion is provided with longitudinally extending ribs 38 having arcuate outer surfaces conforming to a circle the diameter of the pilot hole used. Adjacent ribs 38 form longitudinally extending flutes 40 therebetween. The flutes 40 are aligned with the cutter blades 26 in the cutter portion of the reamer. Thus the cutting edge 32 of the cutter blades may extend all the way to the diameter of the pilot hole, and the cutter blade can still be provided with a large radius bottom fillet 42. The fluting in the pilot portion allows the pilot portion to be made several times as long as the cutter portion without an excessive increase in the total weight of the reamer. The tapered bore 20 also substantially reduces the weight of the pilot portion. It will be noted that neither of these features substantially reduces the bending strength of the pilot portion.

The entire reamer is cast in one piece, even though it is often made in sizes up to 42 inches in diameter and up to ten feet long. This is made possible by the unique proportioning of the various elements of the reamer, which allow cooling of the casting without distortion or cracking and without setting up strains. Thus it will be seen that the reamer has no excessively thick portions. The cutter portion 12, which is the portion subjected to the highest loads, is of substantially uniform thickness throughout, with ample surface being provided for uniform cooling of the casting. Large radius fillets between the cutter blades 26 and the body of the reamer, and between the reduced width portion 28 and the wide outer face of the cutter blade, eliminate the possibility of stresses or cracking during cooling of the casting. These fillets also reduce stress concentrations during operation of the reamer, so that the cutter blades are less likely to be broken.

The provision of the tapered bore 20 and the flutes 40 in the pilot portion also contributes to the uniform cooling of the casting, since wall sections are reduced and ample cooling surfaces are provided.

The proportioning hereinbefore described also allows heat treatment of the entire reamer to obtain strength, hardness, and toughness not heretofore attainable in reamers of the prior art. Due to such proportioning, substantially ideal heat treatment can be effected without danger of distortion or cracking.

Since the casting can be made in one piece and can be heat treated without distortion, it is possible to use steels, which have not heretofore been used for such reamers, which have a high hardenability, so that, by proper heat treating, high hardness can be obtained all the way through the casting, even though some sections may be eight to ten inches thick.

Thus a preferred steel for use in making the reamer of this invention is one containing from about 0.15 to about 0.43 percent carbon, 1.5 to 4.0 percent nickel, from about 0.1 to about 0.35 percent molybdenum, and from about 0.4 to about 0.8 percent manganese. Such steels have high hardenability, and may be heat treated to hardnesses of 225 Brinell to 350 Brinell without leaving any stresses in the casting which can lead to early failure of the reamer.

When the casting is removed from the mold, it is preferably normalized by holding at 1750° F., and then cooled in the furnace. The heat treatment comprises quenching in oil from 1550° to 1600° F., and then drawing at 850° to 900° F. for eight to twelve hours. This treatment results in a hardness of from 225 to 300 Brinell when a steel containing about 0.20 to 0.25 percent carbon is used.

The resulting casting can then have hard surfacing applied to cutting surfaces 31, 32, by means known in the art. For example the hard surfacing may be applied by electric arc welding, using a rod that will result in a deposit hardness of 55 to 58 Rockwell "C" scale.

This invention is not limited to the embodiments hereinbefore shown and described, but only as set forth by the following claims.

I claim:

1. An integrally cast cable tool reamer comprising a body having a reduced neck portion, a cutter portion, and a pilot portion, all in axial alignment, an axially disposed passageway through said neck portion, an enlarged axially disposed passageway through said cutter portion and said pilot portion and in communication with said neck portion passageway, a plurality of radially extending cutter blades on said cutter portion, each said cutter blade having an inner portion of reduced width merging smoothly with said body and an outer portion of increased width and having an arcuately formed outer face, a pair of cutter surfaces on the under side of each cutter blade converging toward each other at an obtuse angle in relation to each other to form a cutting edge, said edge extending from the outer diameter of the pilot portion to the outer end of the cutting blade, the outer face of such cutter having a lesser height than the vertical thickness of the cutter blade at its juncture with said body and a recess in the pilot portion in alignment with said cutting edge.

2. An integrally cast cable tool reamer comprising a body having a reduced neck portion, a cutter portion, and a pilot portion, all in axial alignment, a plurality of radially extending cutter blades on said cutter portion, the juncture of said cutter blades and said body being smoothly blended with fillets of large radius, a cutting edge on the bottom of each cutter blade extending from the outer diameter of the pilot portion to the outer end of the cutter blade, and a recess in the pilot portion in alignment with each cutting edge and including an axially disposed passageway through said neck portion, and a communicating axially disposed passageway of larger diameter through said cutter portion and said pilot portion, the second passageway being tapered to a larger diameter at its lower end.

3. An integrally cast cable tool reamer as defined by claim 2 wherein each said recess comprises a longitudinally extending flute in said pilot portion.

4. An integrally cast cable tool reamer as defined by claim 2 wherein the vertical thickness of each said cutter blade at its juncture with said body is substantially greater than its vertical thickness at its outer end.

5. An integrally cast cable tool reamer as defined by claim 4 wherein each said cutter blade has an inner portion of reduced width and an outer portion of increased width, said portions being smoothly blended with each other.

6. An integrally cast cable tool reamer as defined by claim 2 wherein the vertical thickness of each said cutter blade at its juncture with said body is substantially greater than its vertical thickness at its outer end, and each said cutter blade has an inner portion of reduced width and an outer portion of increased width, said portions being smoothly blended with each other, whereby each cutter blade is of substantially uniform thickness throughout.

7. An integrally cast cable tool reamer as defined by claim 6 wherein the reamer is made of a steel containing from 0.15 to 0.43 percent carbon, from 1.5 to 4.0 percent nickel, from 0.1 to 0.35 percent molybdenum, and from 0.4 to 0.8 percent manganese, and the reamer has a substantially uniform hardness throughout between about 225 Brinell and about 350 Brinell.

8. An integrally cast cable tool reamer comprising a body having a reduced neck portion, a cutter portion, and a pilot portion, all in axial alignment, an axially disposed passageway through said cutter portion and said pilot portion and in communication with said neck portion, a plurality of radially extending cutter blades on said portion, said cutter blades merging smoothly with said body, a pair of cutter surfaces on the under side of each cutter blade converging toward each other at an obtuse angle in relation to each other to form a cutting edge, said edge extending from the outer diameter of the pilot portion to the outer end of the cutting blade, the outer face of such cutter having a lesser height than the vertical thickness of the cutter blade at its juncture with said body, and a recess in the pilot portion in alignment with said cutting edge.

(References on following page)

References Cited in the file of this patent

UNITED STATES PATENTS

| | | |
|---|---|---|
| Re. 16,051 | Brown | Apr. 21, 1925 |
| 1,746,759 | Baker | Feb. 11, 1930 |
| 1,869,843 | Cole | Aug. 2, 1932 |
| 2,209,619 | Wilcox | July 30, 1940 |
| 2,566,913 | Watson | Sept. 4, 1951 |

FOREIGN PATENTS

| | | |
|---|---|---|
| 143,600 | Australia | Oct. 13, 1949 |